United States Patent
Vu et al.

(10) Patent No.: US 9,659,292 B1
(45) Date of Patent: May 23, 2017

(54) STORAGE-BASED REPLICATION OF E-COMMERCE TRANSACTIONS IN REAL TIME

(75) Inventors: Quang Vu, Southborough, MA (US); Mohamad Chehadeh, Watertown, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 2290 days.

(21) Appl. No.: 09/944,287

(22) Filed: Aug. 30, 2001

(51) Int. Cl.
*G06Q 20/00* (2012.01)
*G06Q 20/36* (2012.01)
*G06Q 20/38* (2012.01)

(52) U.S. Cl.
CPC ....... *G06Q 20/3674* (2013.01); *G06Q 20/382* (2013.01)

(58) Field of Classification Search
USPC .......................................................... 705/50
See application file for complete search history.

(56) References Cited

U.S. PATENT DOCUMENTS

| | | | | |
|---|---|---|---|---|
| 4,769,772 A | * | 9/1988 | Dwyer ............................... 707/2 |
| 5,440,727 A | * | 8/1995 | Bhide et al. .................. 711/117 |
| 5,671,358 A | * | 9/1997 | Debe et al. ....................... 705/1 |
| 5,724,575 A | * | 3/1998 | Hoover et al. .................. 707/10 |
| 5,737,601 A | * | 4/1998 | Jain et al. ..................... 707/201 |
| 5,758,097 A | * | 5/1998 | Debe et al. ..................... 705/35 |
| 5,781,910 A | * | 7/1998 | Gostanian et al. ........... 707/201 |
| 5,781,912 A | * | 7/1998 | Demers et al. ............... 707/202 |
| 5,796,999 A | * | 8/1998 | Azagury et al. ................ 707/10 |
| 5,799,322 A | * | 8/1998 | Mosher, Jr. .................... 707/202 |
| 5,806,075 A | * | 9/1998 | Jain et al. ...................... 707/201 |
| 5,819,020 A | * | 10/1998 | Beeler, Jr. ......................... 714/5 |
| 5,864,851 A | * | 1/1999 | Breitbart et al. ................. 707/8 |
| 5,870,760 A | * | 2/1999 | Demers et al. ............... 707/201 |
| 5,870,761 A | * | 2/1999 | Demers et al. ............... 707/201 |
| 5,878,434 A | * | 3/1999 | Draper et al. ................ 707/202 |
| 5,909,540 A | * | 6/1999 | Carter et al. ....................... 714/4 |
| 5,920,863 A | * | 7/1999 | McKeehan et al. ............ 707/10 |
| 5,926,819 A | * | 7/1999 | Doo et al. .................. 707/104.1 |
| 5,937,414 A | * | 8/1999 | Souder et al. ................. 707/203 |
| 5,956,489 A | * | 9/1999 | San Andres et al. .......... 709/221 |
| 5,974,563 A | * | 10/1999 | Beeler, Jr. ......................... 714/5 |
| 5,991,771 A | * | 11/1999 | Falls et al. .................... 707/202 |
| 5,995,980 A | * | 11/1999 | Olson et al. .................. 707/201 |
| 5,999,931 A | * | 12/1999 | Breitbart et al. ................ 707/10 |
| 6,012,059 A | * | 1/2000 | Neimat et al. .................... 707/8 |
| 6,014,669 A | * | 1/2000 | Slaughter et al. .............. 707/10 |
| 6,058,388 A | * | 5/2000 | Molloy ............................ 707/1 |
| 6,058,401 A | * | 5/2000 | Stamos et al. ................ 707/201 |
| 6,122,624 A | * | 9/2000 | Tetro et al. ...................... 705/44 |
| 6,122,630 A | * | 9/2000 | Strickler et al. .................. 707/8 |
| 6,144,999 A | * | 11/2000 | Khalidi et al. ................. 709/219 |
| 6,163,855 A | * | 12/2000 | Shrivastava et al. ............. 714/4 |
| 6,163,856 A | * | 12/2000 | Dion et al. ........................ 714/4 |

(Continued)

*Primary Examiner* — John Hayes
*Assistant Examiner* — John M Winter
(74) *Attorney, Agent, or Firm* — Krishnendu Gupta; Joseph J. D'Angelo

(57) ABSTRACT

The back-end data storage system of an e-commerce system receives a replicated transaction from the data storage system of another e-commerce system and makes a determination or decision whether to commit the replicated transaction based upon a comparison of information parsed from the transaction with predetermined commit criteria.

9 Claims, 2 Drawing Sheets

(56) References Cited

U.S. PATENT DOCUMENTS

| | | | |
|---|---|---|---|
| 6,192,365 B1 * | 2/2001 | Draper et al. | 707/101 |
| 6,202,149 B1 * | 3/2001 | Hedegard | 713/100 |
| 6,243,715 B1 * | 6/2001 | Bogantz et al. | 707/201 |
| 6,263,433 B1 * | 7/2001 | Robinson et al. | 713/100 |
| 6,269,432 B1 * | 7/2001 | Smith | 711/162 |
| 6,301,589 B1 * | 10/2001 | Hirashima et al. | 707/204 |
| 6,304,882 B1 * | 10/2001 | Strellis et al. | 707/202 |
| 6,343,299 B1 * | 1/2002 | Huang et al. | 707/203 |
| 6,360,095 B1 * | 3/2002 | Cunningham et al. | 455/433 |
| 6,381,609 B1 * | 4/2002 | Breitbart et al. | 707/103 R |
| 6,418,447 B1 * | 7/2002 | Frey et al. | 707/103 R |
| 6,421,688 B1 * | 7/2002 | Song | 707/203 |
| 6,425,016 B1 * | 7/2002 | Banavar et al. | 719/310 |
| 6,438,558 B1 * | 8/2002 | Stegelmann | 707/102 |
| 6,442,564 B1 * | 8/2002 | Frey et al. | 707/103 R |
| 6,446,092 B1 * | 9/2002 | Sutter | 707/203 |
| 6,449,734 B1 * | 9/2002 | Shrivastava et al. | 714/15 |
| 6,457,065 B1 * | 9/2002 | Rich et al. | 719/328 |
| 6,499,037 B1 * | 12/2002 | Breitbart et al. | 707/103 R |
| 6,502,095 B2 * | 12/2002 | Breitbart et al. | 707/8 |
| 6,502,103 B1 * | 12/2002 | Frey et al. | 707/103 R |
| 6,505,210 B1 * | 1/2003 | Frey et al. | 707/103 R |
| 6,529,917 B1 * | 3/2003 | Zoltan | 707/201 |
| 6,535,868 B1 * | 3/2003 | Galeazzi et al. | 707/2 |
| 6,553,384 B1 * | 4/2003 | Frey et al. | 707/103 R |
| 6,553,392 B1 * | 4/2003 | Mosher et al. | 707/204 |
| 6,560,609 B1 * | 5/2003 | Frey et al. | 707/103 R |
| 6,567,818 B1 * | 5/2003 | Frey et al. | 707/103 R |
| 6,567,928 B1 * | 5/2003 | Lyle et al. | 714/15 |
| 6,574,750 B1 * | 6/2003 | Felber et al. | 714/20 |
| 6,584,477 B1 * | 6/2003 | Mosher, Jr. | 707/204 |
| 6,594,671 B1 * | 7/2003 | Aman et al. | 707/103 R |
| 6,651,073 B1 * | 11/2003 | Lyle et al. | 707/202 |
| 6,662,196 B2 * | 12/2003 | Holenstein et al. | 707/202 |
| 6,668,260 B2 * | 12/2003 | Zoltan | 707/201 |
| 6,678,882 B1 * | 1/2004 | Hurley et al. | 717/121 |
| 6,691,139 B2 * | 2/2004 | Ganesh et al. | 707/204 |
| 6,701,345 B1 * | 3/2004 | Carley et al. | 709/205 |
| 6,720,920 B2 * | 4/2004 | Breed et al. | 342/386 |
| 6,732,122 B2 * | 5/2004 | Zoltan | 707/201 |
| 6,745,209 B2 * | 6/2004 | Holenstein et al. | 707/203 |
| 6,782,399 B2 * | 8/2004 | Mosher, Jr. | 707/200 |
| 6,823,355 B1 * | 11/2004 | Novaes et al. | 709/201 |
| 6,823,356 B1 * | 11/2004 | Novaes et al. | 709/201 |
| 6,832,229 B2 * | 12/2004 | Reed | |
| 2002/0023129 A1 * | 2/2002 | Hsiao et al. | 709/205 |

* cited by examiner

STORAGE-BASED REPLICATION OF E-COMMERCE TRANSACTIONS IN REAL TIME

BACKGROUND OF THE INVENTION

1. Field of the Invention

The present invention relates generally to transaction processing and, more specifically, to transaction replication in a storage-area network environment.

2. Description of the Related Art

A transaction is an exchange between one computing entity and another that accomplishes a particular action or result. For example, in an electronic commerce (e-commerce) system, the submission of a customer's order and the submission of the customer's credit card information for payment processing is a single transaction from the customer's point of view but involves a group of changes to order files and accounting files by the software that handles the transaction. The software typically interfaces with relational database files (i.e., tables) to access data and make changes to it. A transaction can thus be embodied as a series or list of database table operations, such as deleting an entry from one table, updating an entry in another table, inserting an entry into still another table, etc. A procedure having specific rules, known as a commitment control protocol, ensures that a group of changes made to different database files, such as the above-mentioned order and accounting files, are synchronized so that multiple files all reflect the transaction. The synchronization ensures the integrity of business processes and data by enforcing an "all or nothing" methodology. Each transaction is processed in its entirety or not at all. This is sometimes referred to as the atomicity property of transaction processing. If a failure occurs during processing of a transaction, the synchronization protocol will revert to the state before the transaction was initiated, allowing the transaction to be retried if appropriate.

It is common to replicate e-commerce transactions for backup, mirroring and other purposes. Database replication software is widely available from database software providers such as Microsoft Corporation of Redmond, Wash., Oracle Corporation of Redwood Shores, Calif., and Sybase Inc. of Emeryville, Calif. Database replication can be performed synchronously, wherein individual database operations are made to occur in real time across multiple database systems, or in a batch mode, wherein database operations are queued in a first database system and then transmitted to others. E-commerce transactions represented by a list of database operations have been replicated in such a batch mode. For example, Advanced Queueing, an Oracle product, has been used to store up a number of transactions and then send them as a group to a remote host that controls a back-end database system. E-commerce transactions can also be represented by means other than a list of database operations, such as code generated in Extensible Markup Language (XVIL) or interactions between hosts operating in accordance with Sun Microsystems' JINI technology.

Operators of e-commerce systems may replicate transactions for a variety of reasons. For example, it may be desired to mirror transactions to a second host system to enable business to continue in case a first host system fails. Also, for example, it may be desired to back up transactions using a second host system at a remote location from the first or primary host system so that data are preserved in the event the primary host system loses the data. The hosts typically communicate the e-commerce transactions with each other via the same network, such as the Internet, used by customers to communicate with the primary host. E-commerce transaction replication is thus conventionally a front-end process because it occurs through the Internet and the host order-entry system, which is considered the "front end" of such e-commerce systems, the "back end" being the database systems, data storage systems, order fulfillment systems and other systems that do not directly interface with customers. Back-end data replication facilities are known, but they replicate data from one data storage system to another on a byte-by-byte basis without regard to what the data may represent. The SYMMETRIX Remote Data Facility (SRDF) produced by EMC Corporation of Hopkinton, Mass. is an example. It is used with EMC's SYMMETRIX line of data storage systems.

E-commerce transaction replication is complicated by the absence of universal software for transmitting and receiving transactions and interfacing with the back-end database systems. Front-end software known as a replication manager in the primary host can be used to control replication and transmission of transactions. Front-end software known as a receiver or subscriber in the other host(s) can be used to receive the transactions. Different database systems require different replication managers and receivers. For example, an Oracle database system requires a certain replication manager and corresponding receiver, while a Microsoft SQL database system requires a different replication manager and receiver. Some inconvenience and inefficiency occurs because e-commerce businesses often need to replace software to maintain pace with their growth. A business using a SQL database system, for example, which is popular among smaller e-commerce businesses, will need to replace all SQL-related software, including replication managers and receivers, if it switches to, for example, an Oracle database system.

It would be desirable to provide intelligent, real-time, e-commerce transaction replication that minimizes the burden on front-end host resources. It would further be desirable to provide real-time e-commerce transaction replication that does not require corresponding pairs of replication managers and receivers tied to specific databases or other software applications. The present invention addresses these problems and others in the manner described below.

SUMMARY OF THE INVENTION

The present invention relates to back-end e-commerce transaction replication in which a determination or decision is made whether to commit the replicated transaction based upon a comparison of information parsed from the transaction with predetermined commit criteria.

A first host receives the e-commerce transaction via a data network such as the Internet and may commit the transaction to an associated data storage system, which defines the back end of the e-commerce system. This first data storage system replicates the transaction and transmits the transaction replica to a second data storage system, which defines the back end of a second e-commerce system. The two systems may be geographically remote from one another. The second e-commerce system includes a second host and may also be coupled to the Internet or other network so that it can receive transactions from other sources in addition to the transaction replicas received from the first e-commerce system. The second data storage system parses the transaction replica to extract transaction information. This information can include any information about the transaction. The second data storage system compares the extracted information to predetermined commit criteria and determines whether to commit the transaction. For example, the extracted information can include the source of the transaction, and the criteria can include committing transactions from one source but not another.

In addition to the second e-commerce system selectively committing the transaction based upon predetermined commit criteria, other intelligent determinations can be made and other operations performed upon the transaction. For example, a transaction can be translated from one data format (e.g., database operations, XML operations, JINI operations, etc.) to another. Such functions as well as the replication function can be performed by logic associated with an interceptor device or intelligent storage device, which is a secondary device in the data storage system that allows the primary storage device to continue to perform input/output operation with the host in an uninterrupted manner.

Transaction replication does not adversely impact host performance because it occurs at the back end rather than at the front end of the e-commerce system of which the host and storage system are part. Furthermore, replication is not affected by any changes in front-end host software.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

Figure 1:
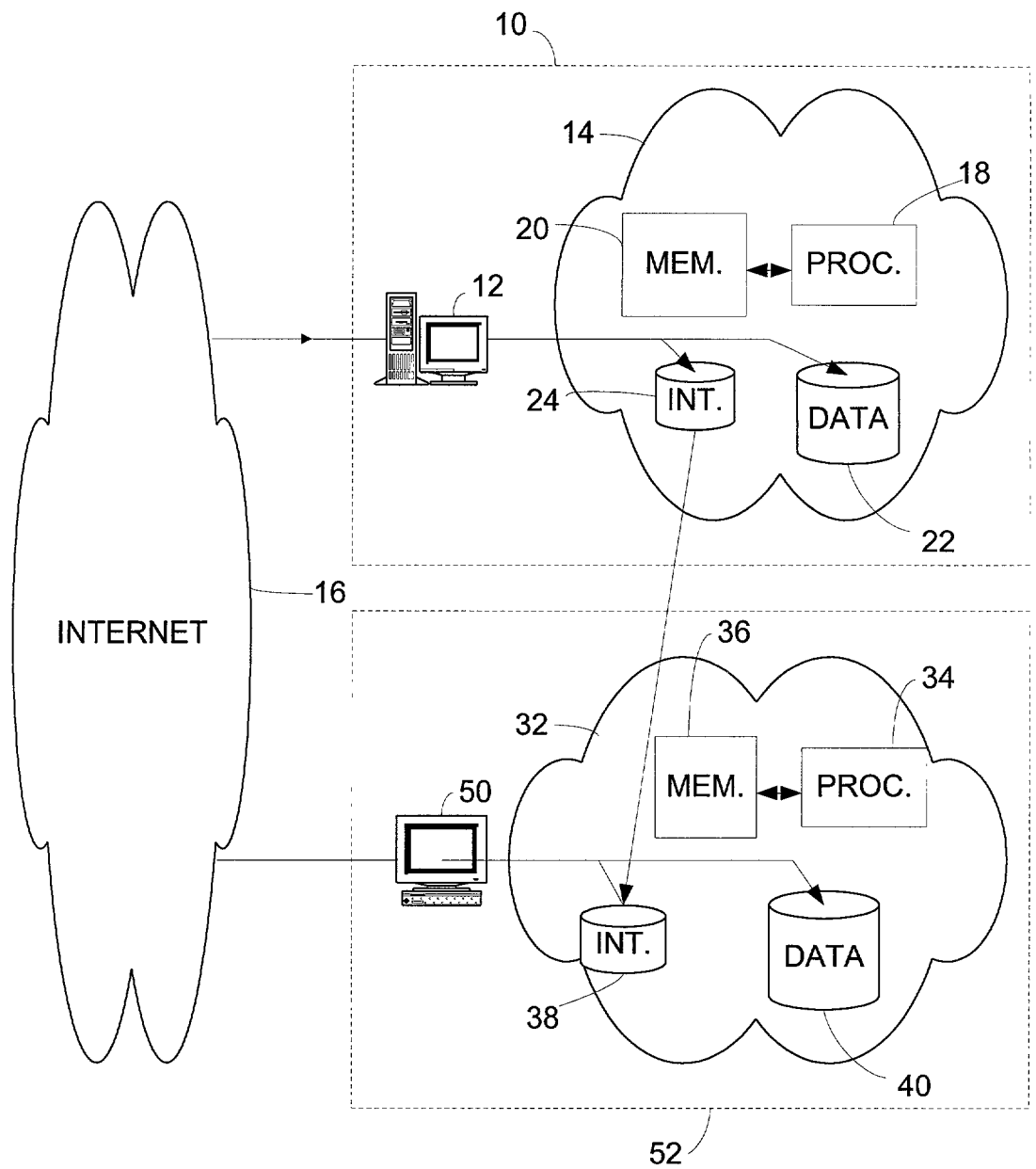
FIG. 1 illustrates back-end replication of an e-commerce transaction from one e-commerce system to another in accordance with an embodiment of the present invention.

As illustrated in FIG. 1, a first electronic commerce (e-commerce) system 10 includes a host 12 and a data storage system 14 connected via a small computer systems interface (SCSI) bus or other suitable data communication link or network, such as Fibre Channel. Host 12 also has a network connection to the Internet 16 or other network through which it can perform e-commerce transactions with other computers or systems (not shown) in the conventional manner. Accordingly, host 12 represents any computer suitable for e-commerce transactions, such as that commonly referred to as a server, or a system of servers, and is programmed to conduct such transactions with remote computer systems. The invention is applicable to any type of e-commerce environment, such as on-line shopping, banking and so forth.

The transaction itself is represented within host 12 in any conventional format. For example, in an embodiment of the invention in an on-line shopping environment, a transaction can take the form of a series of SQL database operations. As well-known to persons skilled in the art to which the invention pertains, typical database operations in the context of e-commerce transactions include deleting an item from a database table, adding an item to a table, and updating a table. In an e-commerce environment, tables represent items available in inventory, items ordered by the purchaser, purchaser credit information, shipping information and so forth. Host 12 builds the transaction or series of database operations as it interacts with the remote computer operated by the purchaser. As a final step, host 12 either commits the transaction by performing all operations in the list or rolls back the transaction by ensuring that none have been performed. Whether a transaction is committed or rolled back and how a transaction is committed or rolled back are concepts well-known to persons skilled in the art and are therefore not described in this patent specification. Committing the transaction means that host 12 causes data storage system 14 to perform the listed operations upon database tables that it stores. Although the above-described example of an on-line shopping transaction in database format is intended to be illustrative, in other embodiments of the invention the transaction can relate to any other suitable type of transaction, such as on-line banking, and can be represented within host 12 in any other suitable format, such as XML or JINI.

Data storage system 14 can be any suitable mass storage platform known in the art, such as the SYMMETRIX line of products produced by EMC Corporation of Hopkinton, Mass. In such an embodiment of the invention, data storage system 14 can include one or more SYMMETRIX units. The SYMMETRIX is an enterprise data storage platform that includes the hardware and software necessary to serve the data storage needs of a business enterprise having one or more such hosts 12. The hardware includes an array of disk drives (not separately shown) that typically have a collective storage capacity on the order of a terabyte or more. Nevertheless, the invention can be used in an environment having any suitable type of data storage system of any capacity. The SYMMETRIX hardware further includes processors 18 and memory 20. Memory 20 includes cache memory, which is used for buffering all input and output data between the SYMMETRIX and host 12, program or control store memory for storing the software under which processors 18 operate, and other memory. Processors 18 can perform sophisticated data storage management tasks under the control of suitable software stored within the SYMMETRIX program memory. Persons skilled in the art are familiar with the myriad software tools or facilities that are available for such data storage systems 14, such as the SYMMETRIX Remote Data Facility (SRDF), described in further detail below.

In the illustrated embodiment of the invention, data storage system 14 includes one or more data storage devices 22 and an interceptor device 24. Devices 22 and 24 represent any suitable divisions of storage system 14, whether physically separate disks of the disk array or logically addressable units or some combination thereof, that can be accessed independently of one another by host 12 or other external machine. Thus, the term "device" or "logical device" or "storage device" as used in this patent specification has the meaning commonly associated with it by persons skilled in the art. The data to which the e-commerce transactions relate, such as database tables, are stored in data storage devices 22 in the conventional manner. In other embodiments of the invention that may not include a separate interceptor device 24, the functions described below with regard to interceptor device 24 can be performed by other suitable means associated with data storage system 14.

In the illustrated embodiment of the invention, interceptor device 24 is a logical device defined within data storage system 14 that operates under the control of software as described below with regard to the flowchart of FIG. 2. Defining, i.e., creating, interceptor device 24 by programming and otherwise configuring a SYMMETRIX unit or similar data storage system 14 is not described in further detail in this patent specification because defining logical devices within such a data storage system 14 is well-known to persons skilled in the art. For example, it is known to define and use such logical devices in SYMMETRIX units as SCSI targets that can receive SRDF commands from host computers and other SYMMETRIX units. Interceptor device 24 can be defined to have any suitable storage capacity because its primary function in the illustrated embodiment of the invention is to serve as a SCSI target for receiving commands from host 12; it need not be used for data storage.

Figure 2:
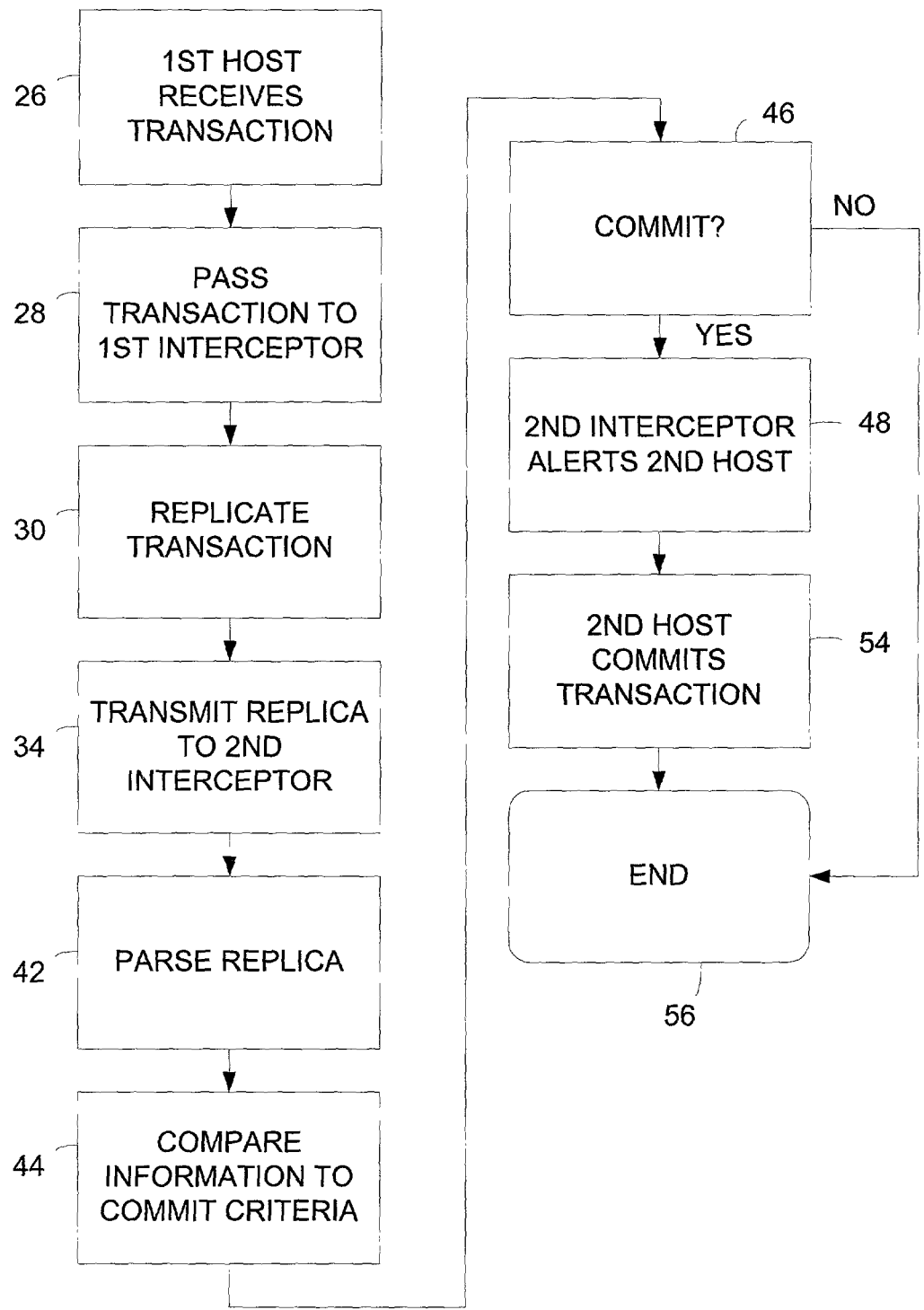
FIG. 2 is a flow diagram illustrating a back-end replication method.

The method by which the present invention operates in the illustrated embodiment is shown in FIG. 2. At step 26 host 12 receives or otherwise provides a transaction of the type described above. At step 28, if host 12 determines to commit rather than roll back the transaction, host 12 commits it in the conventional manner to data storage system 14. Accordingly the transaction operations are performed upon data in data storage devices 22.

Interceptor device 24 provides a means for reading or intercepting the transactions that host 12 commits to data storage system 14. Processor 18 is programmed in accordance with software stored in memory 20 to recognize the data that host 12 writes to the SCSI target ID (address) of interceptor device 24 as that of a transaction to be replicated. In that instance, at step 30 processor 18 causes the transaction data to be replicated. It can use any suitable data replication method or commercially available tool. For example, in embodiments of the invention in which data storage system 14 comprises one or more SYMMETRIX units, SRDF can be used to perform the replication step. Details of the replication itself are not described in this patent specification because SRDF and other software facilities that are conventionally used to mirror and otherwise replicate data in a storage environment are well-known to persons skilled in the art. Mirroring or replication is a well-known process by which a copy or replica of data is copied from one device to another. Using SRDF or a similar facility, processor 18 can further transmit or mirror the replica to a second data storage system 32 (FIG. 1) at step 34. In other embodiments of the invention, before replicating the transaction data, processor 18 can perform additional processing upon it, such as translating its format or performing other transformations. For example, it may be desirable to transform transaction operations received in a proprietary format into a standard format such as SQL, XML or JINI. The additional processing can be more complex, including the types of intelligent or decision-making processing described below with regard to data storage system 32.

Data storage system 32 can be a SYMMETRIX or other suitable system. Accordingly, it includes one or more processors 34 and memory 36. It further includes an interceptor device 38, which is similar to interceptor device 24 described above, and one or more data storage devices 40, which are similar to data storage devices 22 described above.

Like interceptor device 24, interceptor device 38 is defined as a SCSI target. Writing data to its SCSI target ID (address) causes processor 34 to perform the following method steps. At step 42, processor 34 parses the transaction to extract information relating to the transaction. At step 44 processor 34 compares the extracted information to some predetermined commit criteria and, at step 46, determines whether to commit the transaction to data storage devices 40. (Note in FIG. 1 that the arrows in the network and other data connections, e.g., from interceptor device 24 to interceptor device 38, indicate the conceptual flow of the transaction data but not the actual or physical connections between elements of the machines, which are omitted for purposes of clarity.) Although processor 34 performs the actual processing in an embodiment of the invention in which data storage system 32 is a SYMMETRIX or similar unit, more generally or conceptually speaking it is interceptor device 38 that includes or is associated with the decision-making and other processing logic because the processing occurs in response to writing data to interceptor 38.

The commit criteria can include any known in the art plus additional criteria that are based upon the content of the transaction itself. For example, the commit criteria can include committing a transaction involving a first resource and not committing a transaction involving a second resource. The term "resource" includes within its scope of meaning any thing, instrumentality, person or entity that is used, participates in or is otherwise involved in the transaction or its fulfillment. For example, the commit criteria can specify only committing those transactions that involve the sale of a specified item or other subject of the transaction. In another example, the commit criteria can specify only committing those transactions that involve a specified party or group, such as a seller or a third-party that referred the sale to the seller. In still other examples, the criteria can specify committing only those transactions that involve a specified common carrier, shipping mechanism, payment type, warehouse, etc.

The commit criteria can include committing a transaction relating to a first source of a transaction and not committing a transaction relating to a second source. For example, the criteria can specify committing those transactions that were initiated by a party in the United States but not those originating with parties in other countries. The term "source" includes within its scope of meaning not only geographic locations but also persons and entities, such as manufacturers, buyers and sellers that originate the transaction. The term also includes anything that gives rise to the transaction. A buyer, seller or other party can be not only a source of a transaction but also a resource in a transaction.

The transaction information that is compared to the commit criteria can be embedded or otherwise included in the transaction along with the conventional types of transaction information, such as database table operations or XML code, at the time host 12 receives or builds the transaction. For example, among a sequence of conventional database operations such as Add, Delete and Update (table entries) additional information that identifies the geographic source of a transaction can be included. To parse the transaction replica at step 42, processor 34 first identifies the transaction format. For example, it may recognize the format as database operations or, alternatively, it may recognize the format as XML. In some embodiments of the invention the format may be predetermined. That is, processor 34 does not need to distinguish among different formats because only one format is ever used. If the format is known, processor 34 can readily parse the transaction to extract the information that is to be compared to the commit criteria.

If processor 34 determines or decides to commit the transaction replica, at step 48 it can alert a second host 50. Either host 50, in response to being alerted or, alternatively, processor 34 itself, can initiate the commit. Host 50 and data storage system 32 are part of a second e-commerce system 52. Note that e-commerce system 52 takes some of the load off e-commerce system 10 by handling the decision whether to commit the replica. E-commerce system 52 can, but need not in all embodiments of the invention be, connected to Internet 16 and receive other transactions via Internet 16. In such embodiments, it may be desirable for host 50 to handle fewer front-end transactions or otherwise be more lightly loaded than host 12 to more evenly balance the overall load between the two e-commerce systems 10 and 52.

Once the transaction replica has been committed to data storage devices 40 at step 54, the transaction replication is complete. A copy or replica of the same transaction that has been committed to data storage devices 22 of first e-commerce system 10 has also been committed to data storage devices 40 of second e-commerce system 52. The method ends at step 56.

Note that although the illustrated embodiment of the invention relates to a process whereby a transaction is replicated from first e-commerce system 10 to only a second e-commerce system 52, in other embodiments of the invention the transaction can be replicated to additional e-commerce systems or additional storage systems (not shown). The replication can continue in a chain-like manner, propagating the transaction from system to system, or it can branch out from one system to others. Such additional replication can be used in, for example, a scenario in which a number of e-commerce systems define a supply chain or a scenario in which a financial institution or other authority has multiple branches or banks that are to be informed of a transaction. As described above, each system receiving a transaction replica can decide whether to commit the transaction, based upon its own predetermined commit criteria.

The above-described embodiment illustrates using the data storage systems in the back end of e-commerce transaction processing systems to provide intelligent or selective transaction replication. The replication mechanism of the present invention does not adversely impact the (front-end) processing of e-commerce transactions by second host 50 because the replication is a back-end function. Furthermore, because the replication is a back-end function, it is not affected by any changes in front-end host software.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for replicating an e-commerce transaction, comprising:
   a first host receiving the e-commerce transaction via a data network, the first host coupled to a first back-end data storage system, the e-commerce transaction comprising a list of database table operations;
   the first host committing the transaction to the first back-end data storage system;
   replicating the transaction, at the first back-end data storage system;
   the first back-end data storage system transmitting the replicated transaction to a second back-end data storage system coupled to a second host;
   parsing, by the second back-end data storage system, the replicated transaction to extract transaction participant characteristic information;
   making a determination, based at least in part on the extracted transaction participant characteristic information, whether to commit the replicated transaction, and, based on a positive determination to commit, committing by the second back-end data storage system the replicated transaction by performing the list of database operations to mirror or back-up selective transactions of the first data storage system.

2. The method claimed in claim 1, wherein the second host receives other e-commerce transactions via the network.

3. The method claimed in claim 1, wherein the step of making a determination to commit the transaction replica and the step of the second back-end data storage system committing the transaction replica occur without interrupting data communication between a host and a storage device to which the transaction replica is committed.

4. The method claimed in claim 3, wherein the second back-end data storage system includes a main storage device and an interceptor device, and the interceptor device has logic associated with it for making the determination to commit the transaction replica.

5. The method claimed in claim 4, wherein the first back-end data storage system includes a main storage device and an interceptor device, and the interceptor device has logic associated with it for performing operations upon the transaction before the replicating step.

6. The method claimed in claim 1, wherein the extracted transaction participant identifies a seller involved in a transaction, and wherein making a determination to commit the transaction replica based at least in part on the extracted transaction participant characteristic further comprises:
   making a determination to commit a transaction involving a first seller and making a determination not to commit a transaction involving a second seller.

7. The method claimed in claim 1, wherein the extracted transaction participant characteristic identifies a buyer involved in a transaction, and wherein making a determination to commit the transaction replica based at least in part on the extracted transaction participant characteristic information further comprises:
   making a determination to commit a transaction involving a first buyer and making a determination not to commit a transaction involving a second buyer.

8. The method claimed in claim 1, wherein the extracted transaction participant characteristic identifies a third-party referral source of a transaction, and wherein making a determination to commit the transaction replica based at least in part on the extracted transaction participant characteristic information further comprises:
   making a determination to commit a transaction involving a first third-party referral source and making a determination not to commit a transaction involving a second third party referral source.

9. The method claimed in claim 1, wherein the extracted transaction participant characteristic identifies a manufacturer involved in a transaction, and wherein making a determination to commit the transaction replica based at least in part on the extracted transaction participant characteristic further comprises:
   making a determination to commit a transaction involving a first manufacturer and making a determination not to commit a transaction involving a second manufacturer.

* * * * *